(12) United States Patent
Bader

(10) Patent No.: US 7,644,620 B2
(45) Date of Patent: Jan. 12, 2010

(54) SENSOR COMPRISING A MODULAR CONNECTION

(75) Inventor: Christopherus Bader, Neftenbach (CH)

(73) Assignee: Priamus System Technologies AG, Schaffhausen (CH)

( * ) Notice: Subject to any disclaimer, the term of this patent is extended or adjusted under 35 U.S.C. 154(b) by 220 days.

(21) Appl. No.: 10/586,625

(22) PCT Filed: Jan. 18, 2005

(86) PCT No.: PCT/EP2005/000409

§ 371 (c)(1),
(2), (4) Date: Oct. 31, 2006

(87) PCT Pub. No.: WO2005/071379

PCT Pub. Date: Aug. 4, 2005

(65) Prior Publication Data

US 2008/0223144 A1    Sep. 18, 2008

(30) Foreign Application Priority Data

Jan. 21, 2004    (DE) .................. 10 2004 003 278

(51) Int. Cl.
*G01L 7/00* (2006.01)
(52) U.S. Cl. .................................................. 73/714
(58) Field of Classification Search ............... 73/700, 73/756, 714
See application file for complete search history.

(56) References Cited

U.S. PATENT DOCUMENTS 3,735,639 A * 5/1973 Akeley .................... 73/728
5,535,629 A   7/1996 Gerdes et al.
6,708,566 B1 * 3/2004 Thompson et al. ........... 73/714

FOREIGN PATENT DOCUMENTS

CH             320373        5/1957

\* cited by examiner

*Primary Examiner*—Andre J Allen
(74) *Attorney, Agent, or Firm*—Bachman & LaPointe, P.C.

(57) ABSTRACT

A sensor comprising a base body and a sensor element, in particular for transforming and/or transferring measuring variables. The sensor element is associated with a receiving element.

10 Claims, 3 Drawing Sheets

SENSOR COMPRISING A MODULAR CONNECTION

BACKGROUND OF THE INVENTION

The invention relates to a sensor having a basic body and a sensor element, for converting and/or transmitting measured variables.

Sensors are used in the most varied forms in virtually all industrial applications. Wherever processes must be monitored and/or controlled, it is necessary for the variables to be measured to be sensed, if appropriate converted, passed on and, if appropriate, processed.

In accordance with the physical variable to be measured, the sensors are equipped with sensor elements suitable for the purpose. These sensor elements must be reactive to the physical variable to be measured. In most cases, it is desirable that the physical variable to be measured is converted into another physical variable, in particular electric or optical signals.

The boundary conditions in the respective case of use dictate the form and configuration of the sensors. Thus, various cases of use can require the need to use sensors that are respectively individually tailored. This can result in high production costs for the sensor system of a plant and/or in a case of use.

U.S. Pat. No. 5,535,629 discloses a sensor for determining the pressure of a medium. A pressure measuring cell with a diaphragm is located in a connecting housing. Also screwed into the connecting housing is an exchangeable connecting element via which the entire sensor can be inserted into a wall. So that the medium to be measured can pass to the pressure measuring cell or diaphragm, the connecting element is penetrated by an axial bore through which the medium to be determined is guided to the diaphragm.

It is the object of the present invention to provide a sensor for the respective application that can be used multifariously and variably.

SUMMARY OF THE INVENTION

The foregoing object is achieved by providing a sensor element which is assigned a receiving element, which receiving element records the variable to be measured directly from the medium to be measured and transmits it to the sensor element.

The receiving element transmits the variable to be measured, but still does not perform any conversion of measured variables. Consequently, the material requirements placed on the receiving element are not particularly high, and so simple and cost-effective materials can be used. Also, these materials can expediently be easily processed, and can thus be adapted quickly and easily to local conditions.

When it is possible for the adaptation to the spatial conditions to be limited to the receiving element, it is always possible to use the same sensor element, which can be fastened on a basic body and is always the same. Only the receiving element is adapted. It is possible in this way for a sensor to be produced quickly and cost effectively for a specific application by simple adaptation of the receiving element to local conditions.

It is advantageously possible to assign the sensor element different receiving elements. As a result, the sensor can be produced quickly for a specific case of use with specific spatial boundary conditions by assigning a specific receiving element.

The receiving element can preferably be exchanged or detached. This is done using a type of modular system. Consequently, the sensor can be used consecutively in time with different receiving elements with a sensor element, this being done in various cases of use. This is of great interest when the measurement requires an expensive sensor element that need not always be used and can be used at another location.

If the sensor element is permanently connected to the receiving element, in particular bonded, pinned, riveted or pressed, cases of use are possible where properties of a non-detachable connection are required.

Adaptation to local conditions is frequently done by adapting the sensor to a specific size and forms of the cutout. In particular, the cutout is frequently a bore. The adaptation of the sensor is advantageously performed by adapting the receiving element to these bores. In the most favorable cases, a tip with a cross-sectional shape and/or end face is formed on a raw receiving element such that the receiving element can be inserted into the bore provided for the purpose.

The sensor element is advantageously connected to the basic body in a re-detachable fashion. This broadens the idea of the principle of the modular system to the effect that various forms of sensor elements can be used. This can be interesting wherever it is insufficient for only the receiving element to be adapted to the local conditions.

It is, furthermore, conceivable that the sensor elements that can be assigned differ from one another in the type of measured variable to be converted. Thus, on one occasion the basic body could be assigned a sensor element that is sensitive to temperature, and on another occasion a sensor element sensitive to pressure.

In an advantageous refinement, the receiving element is a pressure and/or force transmitting element. In this application, use can be made of materials that are particularly easy and advantageous to process. For example, but not exclusively restrictive thereto, consideration is given here to the use of sensors in injection molds, where a cavity pressure can be transmitted via such a force transmitting element onto a sensor element. By adapting the sensor element to the boundary conditions of the respective case of use, it is possible for the sensor thereby to be used more multifariously.

In the application outlined by way of example of the injection mold with an identical basic body but different sensor elements and/or receiving elements, it would be possible to measure not only the pressure, but also the temperature.

BRIEF DESCRIPTION OF THE DRAWINGS

Further advantages, features and details of the invention emerge from the following description of preferred exemplary embodiments, as well as with the aid of the drawing, in which.

DETAILED DESCRIPTION

Figure 1:
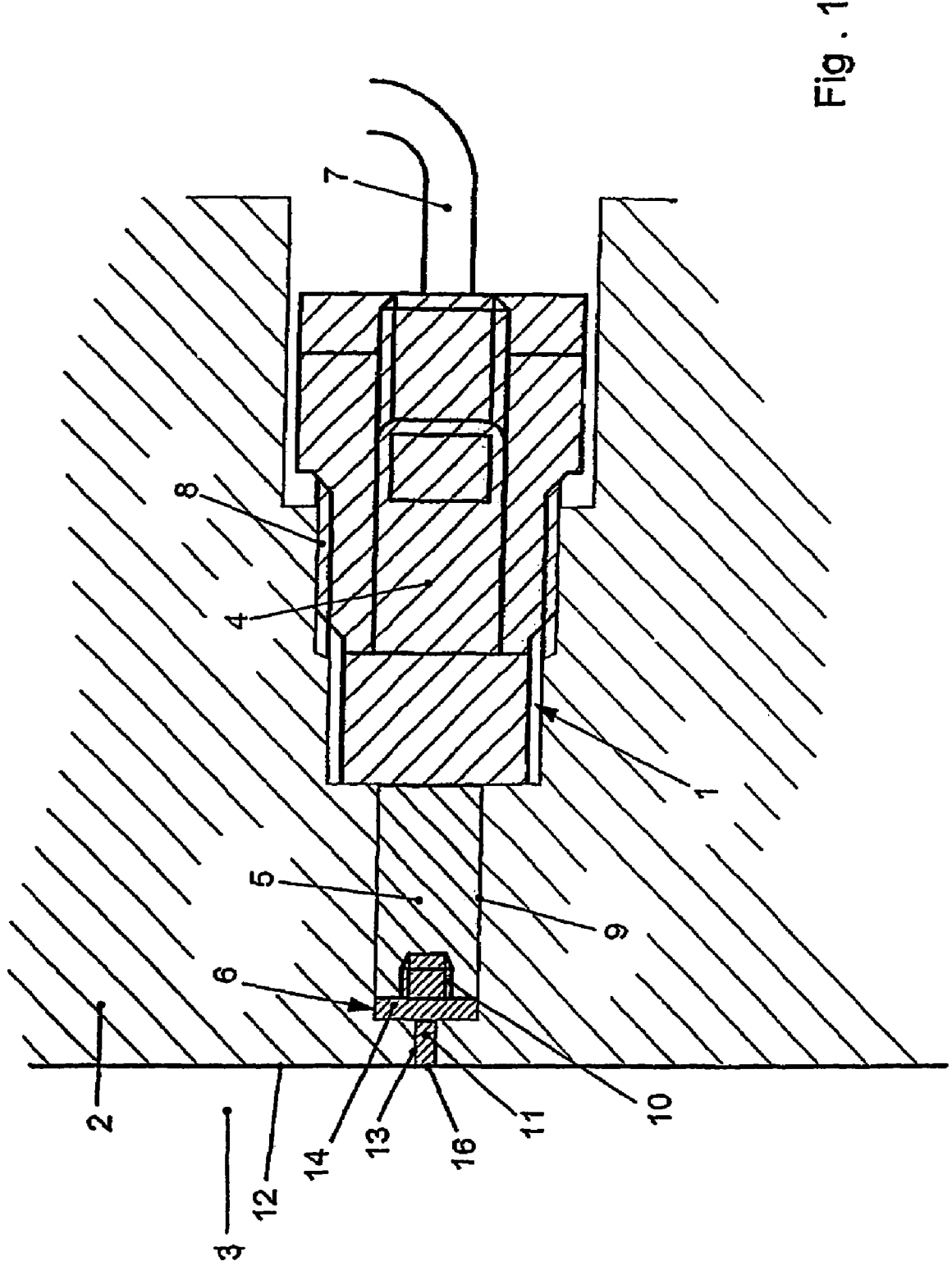
FIG. 1 shows a longitudinal section through a pressure sensor for measuring the pressure of a cavity in an injection mold, in the position of use.

A sensor 1 can be seen in FIG. 1 that is installed in a wall 2 of a cavity 3 of an injection mold. The task of the sensor 1 is to measure in the cavity 3 the pressure of the molten plastics material which is being cured. It consists of a basic body 4, a sensor element 5 and a receiving element 6. A cable 7 leads rearward, for example via a cable channel, to an evaluation unit (not illustrated).

The basic body 4 is screwed in the wall 2 by means of a thread 8. Adjoining the basic body 4 in the direction of the cavity 3 is the sensor element 5, which is guided in a bore 9. The receiving element 6 is arranged between the sensor element 5 and the cavity 3. The receiving element 6 is screwed to the sensor element 5 via a thread 10. A tip 11 of the receiving element 6 is guided in a bore 13, and an end face 16 of the tip 11 lies in the plane of an inner wall 12 of the cavity 3.

A diameter of the bore 13 is smaller than the diameter of the bore 9. The base part 14, screwed to the sensor element 5, of the receiving element 6 is likewise guided in the bore 9.

The receiving element 6 is a pressure and/or force transmitting element.

The mode of operation of the invention is as follows:

During production of the sensor 1, the basic body 4 is connected to the sensor element 5 and the receiving element 6. Thereafter, the sensor 1 is inserted into the bores 9 and 13, provided therefor, in the wall 2, and screwed in the wall 2 by means of the thread 8.

In this arrangement, the pressure receiving element 6 is adjacent to the cavity 3 and transmits the pressure in the cavity 3 to the sensor element 5, which performs a conversion of the measured variables. In particular, the cavity pressure, which is transmitted to the sensor element 5 via the receiving element 6, can be converted into electric signals that are passed on to an evaluation unit (not illustrated) via the basic body 4 of the sensor 1 and via the cable 7. However, it is also conceivable for the sensor element 5 to convert the pressure into another variable that can be passed on, for example into an optical one, which is passed on to an evaluation unit via an appropriate transmitting means.

Figure 2:
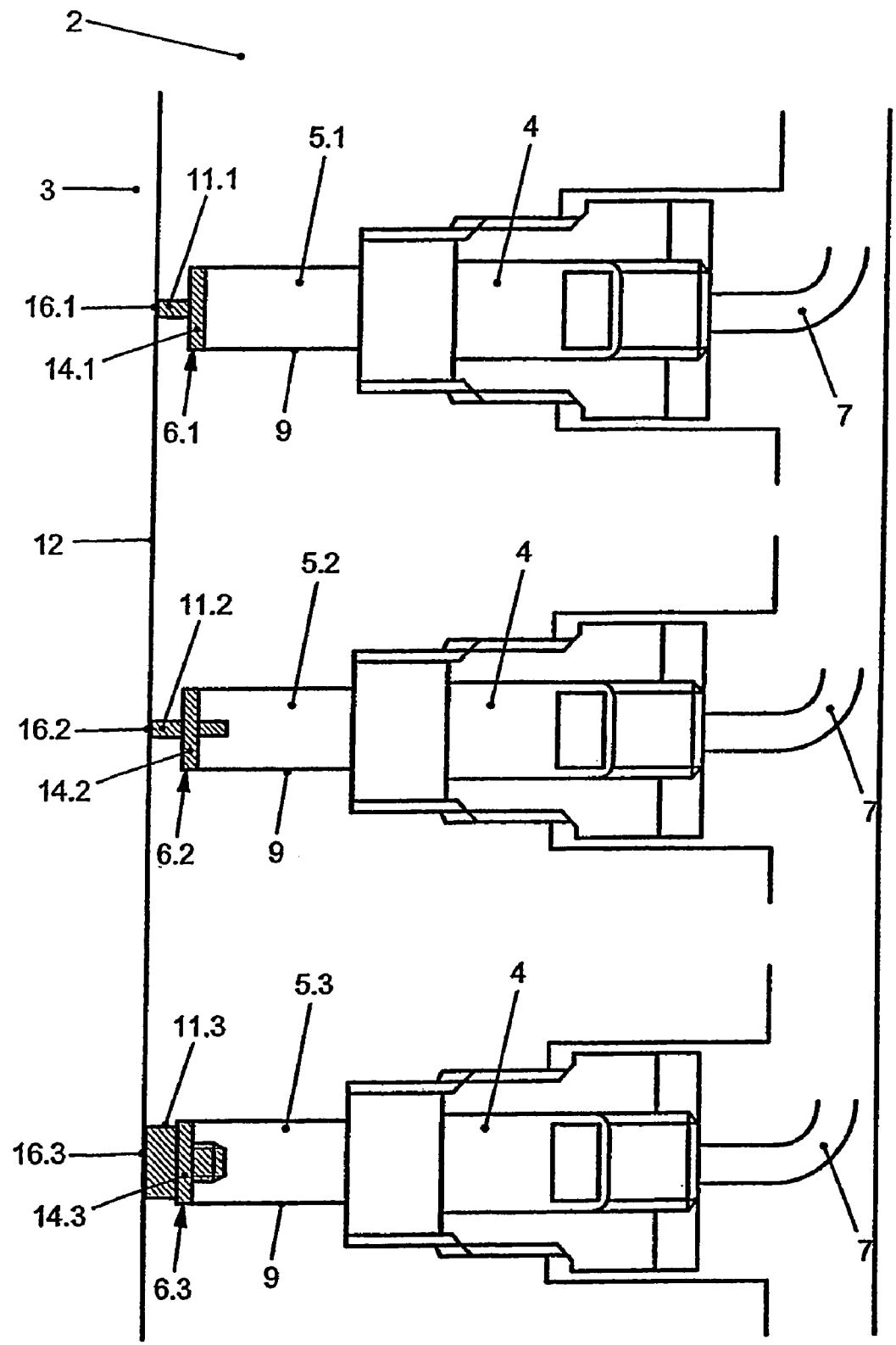
FIG. 2 shows a schematic view of a longitudinal section of a number of pressure sensors having different receiving elements, in the position of use.

Visible in FIG. 2 are a number of sensors that are arranged in the wall 2 of the injection molding machine. They all consist of the same basic body 4. However, they vary in their sensor and receiving elements 6. The end face 16.1 of the tip 11.1 of the receiving element 6.1 has the smallest diameter. The base part 14.1 is bonded to the sensor element 5.1.

The tip 11.2 of the receiving element 6.2 has a larger end face 16.2 than the tip 11.1 of the receiving element 6.1. The base part 14.2 is pinned to the sensor element 5.2.

The tip 11.3 of the receiving element 6.3 has an even larger end face 16.3. The receiving element 6.3 is screwed with the aid of its base part 14.3 to the sensor element 5.3.

The three illustrations constitute a selection of various embodiments of the sensor 1. Firstly, various possibilities become plain for connecting the receiving elements to the sensor elements, depending on the field of application. Furthermore, it becomes clear that various bores 13 on a wall 2 can be fitted with one and the same basic body 4 by means of various sensor and receiving elements, without performing any hardware changes.

Figure 3:
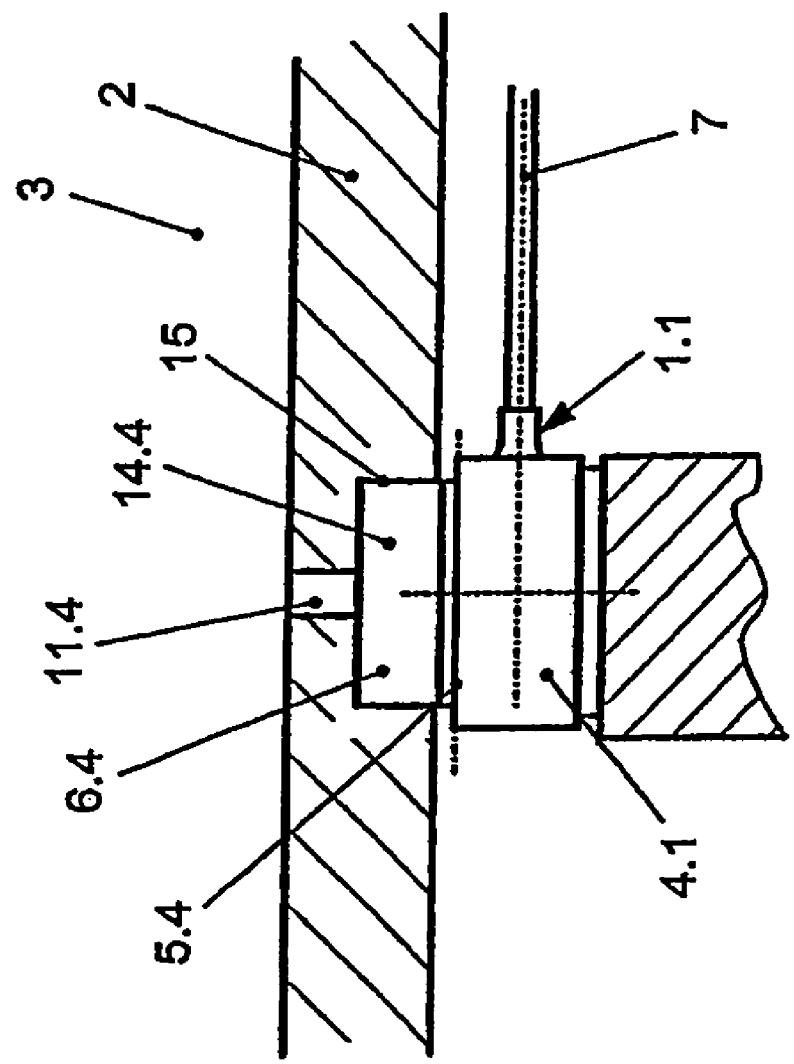
FIG. 3 shows a partial section through a force sensor having a receiving element in the wall of a cavity.
Figure 4:
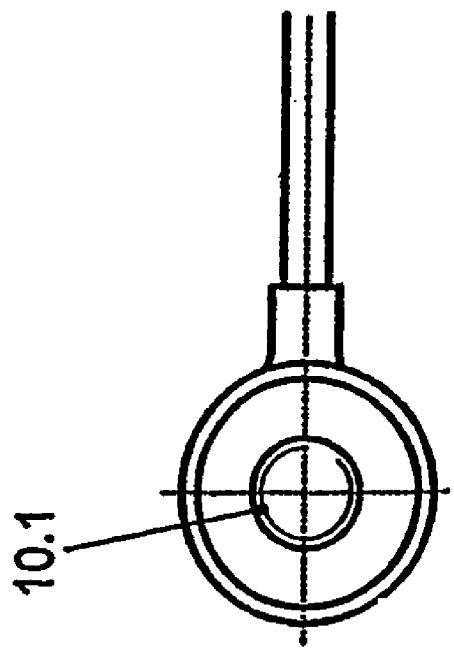
FIG. 4 shows a plan view of the force sensor from FIG. 3 without the receiving element.

A further exemplary embodiment of a sensor 1.1 is illustrated in FIG. 3. This is a force sensor that has a basic body 4.1 and a sensor element 5.4 that is connected to a receiving element 6.4. In this case, the connection is performed via a thread 10.1, as is to be seen from FIG. 4.

In this exemplary embodiment, as well, it is respectively possible to use the same basic body 4.1 and the same sensor element 5.4 for different applications, doing so by selecting the receiving element 6.4 and/or the tip 11.4 and/or the base part 14.4 in accordance with the requirements of the application and the local conditions.

The invention claimed is:

1. A sensor comprising a basic body, a sensor element for converting and/or transmitting measured variables, and a receiving element having a base portion in direct contact with the sensor element and a tip portion, the tip portion has an end face wherein only the end face of the tip portion directly contacts a medium whose variables are to be measured.

2. The sensor as claimed in claim 1, wherein different receiving elements can be exchanged in the sensor element.

3. The sensor as claimed in claim 1, including a plurality of receiving elements wherein the receiving elements can be exchanged in the sensor element.

4. The sensor as claimed in claim 1, wherein the sensor element is permanently connected to the receiving element.

5. The sensor as claimed in claim 3, wherein the plurality of exchangeable receiving elements have various cross-sectional shapes and/or cross-sectional surfaces for installation in corresponding cutouts in the sensor element.

6. The sensor as claimed in claim 1, wherein the sensor element is detachably connected to the basic body.

7. The sensor as claimed in claim 6, wherein different sensor elements can be assigned to the basic body.

8. The sensor as claimed in claim 1, wherein the receiving element is a pressure and/or force transmitting element.

9. The sensor as claimed in claim 1, wherein the receiving element is a temperature transmitting element.

10. The sensor as claimed in claim 2, wherein the base portion of the receiving element has means for removably securing the receiving element to the sensor element.

\* \* \* \* \*